United States Patent [19]
Wise

[11] 3,710,812
[45] Jan. 16, 1973

[54] METHOD OF AND MEANS FOR REPAIRING LATERAL BRANCHES OF SUB-SURFACE PIPE LINES

[75] Inventor: Donald S. Wise, Levittown, Pa.
[73] Assignee: Telafix Incorporated, Levittown, Pa.
[22] Filed: Aug. 5, 1971
[21] Appl. No.: 169,433

[52] U.S. Cl. ...................... 137/15, 137/315, 138/97
[51] Int. Cl. ............................................ F16l 55/18
[58] Field of Search ................... 137/15, 315; 138/97

[56] References Cited

UNITED STATES PATENTS

| | | | |
|---|---|---|---|
| 3,149,646 | 9/1964 | Xenis | 137/15 X |
| 3,267,967 | 8/1966 | Guthrie | 138/97 |
| 3,269,421 | 8/1966 | Telford et al. | 138/97 |
| 3,472,285 | 10/1969 | Ginsburgh et al. | 137/15 X |

Primary Examiner—Martin P. Schwadron
Assistant Examiner—David R. Matthews
Attorney—W. Wycliff Walton

[57] ABSTRACT

This invention is directed to providing a method of and apparatus for repairing faults and breaches in lateral branches of sub-surface pipe lines into which it is impracticable or impossible to introduce sub-surface pipe line repair apparatus. In accordance with the invention such apparatus is employed in the main line with auxilary apparatus introduced into the lateral branch to provide a combination whereby a fault or breach, hereinafter generically designated fault, constituting the source of infiltration into the lateral and hence into the main can be located, and thereafter by introduction of a chemical repair substance from the main line into the lateral branch and through the fault terminate the infiltration and seal the lateral against further infiltration.

6 Claims, 2 Drawing Figures

PATENTED JAN 16 1973

3,710,812

INVENTOR.
DONALD S. WISE

ATTORNEY.

METHOD OF AND MEANS FOR REPAIRING LATERAL BRANCHES OF SUB-SURFACE PIPE LINES

CROSS REFERENCES TO RELATED APPLICATION

In a co-pending application titled METHOD OF AND MEANS FOR EXAMINING AND REPAIRING SUB-SURFACE PIPES filed in the U.S. Patent Office concurrently herewith I have disclosed an improved examination and repair unit utilizing the focal plane of a lens system associated with a television camera in a preferably closed system and indicia on the viewing screen of a monitoring instrument for locating faults in sub-surface pipe lines or the like. That unit, and the method employed with its aid for examining a sub-surface pipe line, or lines are eminently suitable in accordance with the present invention for combination and association with other apparatus for the performance of novel method steps hereinafter more fully described in locating faults in lateral pipe lines into which the examination and repair unit cannot readily be introduced, and for effecting their repair.

BACKGROUND OF THE INVENTION

1. Field of the Invention

The invention is concerned with sub-surface pipe line and conduit repair to eliminate flow of ground water and the like into pipe lines and conduits, and especially examination and repair of lateral branches of main lines on which the customary examination and repair units cannot be used.

2. Description of the Prior Art

It has become standard procedure to introduce a combined examination and repair unit into a sub-surface pipe line or conduit to which access can be had through manholes spaced at intervals longitudinally of the pipe line. These require that access be available to at least two such manholes and where a lateral branch such as a sewer line leading from a single detached dwelling to a sewer main in the adjacent highway has a fault affording ingress to extraneous sub-surface ground water and the like such unit cannot be introduced into the lateral or branch line. Hence, it has heretofore been necessary in such cases to excavate the soil and repair the line by application of appropriate external expedients, as by replacing a section of the pipe or introducing sealing material into the excavation to surround the pipe at the fault and seal it from without. Apart from the labor and expense of excavation and concomitant operations this procedure imposes inconvenience in that it is often necessary to declare the lateral branch unavailable for normal usage while repairs are being made.

SUMMARY OF THE INVENTION

The invention is directed to locating a fault or other breach in a lateral sewer line or the like by first using known procedures including observation of effluent with aid of a closed circuit television system, identifying the lateral branch in which the fault exists and then by novel further procedures including introducing inflatable obstructing means into the thus identified lateral branch specifically locating the fault and introducing plastic material into the branch from a repair unit in the main for extrusion through the fault to seal the same against further intrusion of ground water or the like.

BRIEF DESCRIPTION OF THE DRAWING

In the accompanying drawing.

DESCRIPTION OF THE PREFERRED EMBODIMENT

Figure 1:
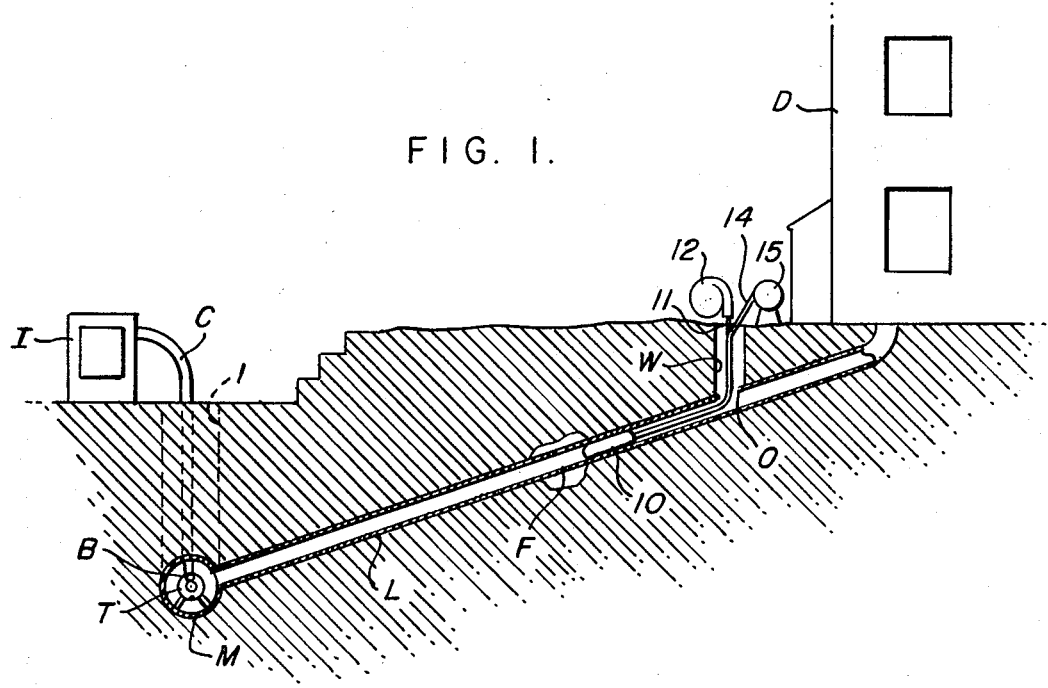
FIG. 1 is a diagrammatic vertical section of a sub-surface lateral line connecting for example, a residential structure with a sewer main under the adjacent highway.
Figure 2:
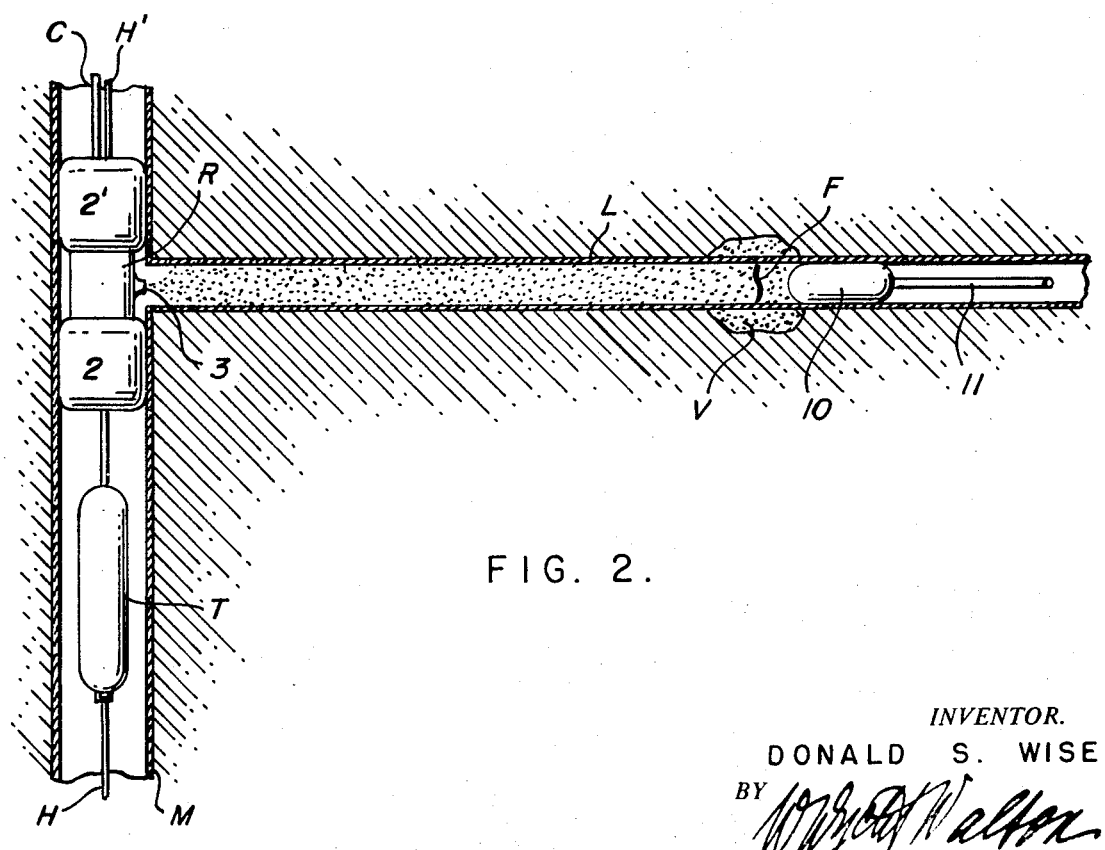
FIG. 2 is a fragmentary horizontal section of an enlarged scale showing inflatable means utilized to temporarily exclude flow of liquids from the lateral main to facitilate locating a fault or an infiltration point and while it is being repaired.
Figure 2:

While I prefer to employ as an examining and repair unit the apparatus disclosed in my said co-pending application but any other unit capable of more or less comparable performance may be employed as preferred, provided it comprises an observation unit, such as a television camera T, electrically connected through a cable C extending in the subterranean main pipe line M with a monitoring unit I on the screen of which an image of the field of view of the camera may be reproduced, lighting means B carried by the camera unit T permitting said field to be adequately illuminated for television reception by the camera. Energizing power for the camera as well as for the lighting means B are supplied by flexible conductors, contained in cable C and fed with it into the main from a manhole 1 as the camera and repair unit is drawn along the main by a hawser H leaving the main from an adjacent manhole. The camera has attached to it for conjoint progress through the main a repair unit R maintained at a predetermined distance in rear of the camera in relation to its direction of travel and a flexible hose fed with cable C through the manhole 1 is connected to a suitable pump (not shown) for extruding plastic grouting into the repair unit and from it into the surrounding space, the repair unit including also a pair of axially spaced bladders or inflatable collars 2,2' between which the exit port 3 for the plastic grouting material is positioned. These collars 2, 2' are connected through a hose H' with an air pump (not shown) on the surface adjacent manhole 1 as is customary, enabling the collars to be inflated and deflated as desired. This apparatus is all old in the art and need not be more fully described.

Other apparatus adapted for combined operation and association with the foregoing in accordance with the invention, includes flexible inflatable means 10 having connected with it an air hose 11 which communicates at its opposite end with a pump 12 or other source of air under pressure, a control hawser 14 connected to a winch 15 being built into or attached to the hose 11 to provide means for controlling the inflatable means when it has been entered into a lateral or branch pipe line.

In the operation of repairing a fault or breach in a lateral or branch pipe line with the aid of apparatus above described and in accordance with the invention, the lateral branch L in which the fault F occurs is first examined with the aid of the examining unit, In accordance with known procedures or as described in my said co-pending application, the appearance on such examination of an abnormal flow of liquid from a lateral affords evidence by which a leaking one may be identified. Fault F in lateral L in the drawing represents such a breach in the wall of a section of pipe comprised in the branch line while a void V surrounding the pipe in the vicinity of the fault is one of the character of those usually found at such locations due to the infiltrating water carrying with it sediment washed from the surrounding soil; obviously the fault may be at any location along the line, and the void V may be greater or smaller than as shown depending on conditions.

The offending lateral having been identified with the aid of the examining unit the inflatable means 10 is introduced into the lateral through a clean-out opening O and of the type usually found either in the lowest floor of the adjacent building D or as in FIG. 1 at an access well W adjacent to but exteriorly of the building. The inflatable means, uninflated, when so introduced, with the hose 11 and hawser 14 attached and fed into the line as the inflatable means progresses, usually is carried along the pipe by the normal flow of water, or an excessive flow of water may be introduced for the purpose if required. When the inflatable means as a result of this operation reaches the main line, and thus can be observed with the aid of the examining unit as having atained the junction of the branch with the main its further progress is interrupted by restraint upon the hawser 14 and the inflatable means is then partially inflated through the hose 11 to a degree sufficient to enable it to restrict, or substantially obstruct flow of liquid past it, but without creating so much friction between it and the pipe wall as to prevent its retraction toward the clean out opening with the aid of the hawser 14 and a retracting winch 15. As the inflatable means is drawn through the branch line away from the main little or no liquid is observed flowing into the latter until the said means reaches and passes a fault F through which ground water enters the branch and thereafter may flow unobstructed into the main. Its appearance at the junction of the branch with the main, as observed with the aid of the examining unit, is evidence that the inflatable means in its movement away from the main has passed the fault and at this point further retraction of the inflatable means is halted, the air pressure therein is increased to positively obstruct all flow of liquids from upstream in the lateral. The repair unit is then moved in the main to align it with the downstream end of the branch at its junction with the main and plastic repair material, for example gel grout A M-9 marketed by American Cyanimide Co., is injected through the repair unit into the main adjacent the end of the lateral, thence into the lateral and through the fault into the surrounding soil. Injection of the repair material is continued preferably until it entirely fills the void V whereupon excessive backpressure in the grout feed line develops, demonstrating that the void has been filled and further feeding of grout is discontinued.

After the void V has been filled, sufficient time is allowed to elapse, if required, to enable the plastic material to congeal or set, the examination and repair unit is removed from the main, the inflatable means deflated and withdrawn from the lateral. Ordinary flushing of the lateral with water is thereupon usually sufficient to carry residual grout material from the lateral into the main and at least to the nearest downstream manhole affording access to the main, through which it may be removed, or it may be permitted to be flushed through the main to its outlet.

At times, the grout material may set in the lateral sufficiently to resist removal by mere flushing with water and in such instances waterjet propelled cleaning apparatus may be introduced into the lateral for clearing the obstruction, after which normal use of the lateral and main may be resumed, the grouting material in void V in the course of time usually becoming so rigidly set as to protect that portion of the lateral encased within it fully as effectively as adjacent portions are protected by the soil surrounding them.

I claim:

1. The method of repairing a fault in a tubular subsurface lateral branch of a sub-surface conduit which comprises locating the branch containing the fault, introducing inflatable means into the branch at a point remote from the conduit, projecting said means in the branch to its junction with the conduit, inflating said means to thereby substantially inhibit flow of fluid from the branch to the conduit, retracting said means toward the point of its introduction to the branch to a point between the fault and said point of introduction, discharging into a restricted portion of the conduit communicating with said branch a grout material until said material fills the branch between said inflatable means and said junction and is extruded through the fault, then removing the inflatable means from the branch and the conduit restricting means from the conduit and discharging grout material from the branch into the conduit.

2. The method defined in claim 1 in which the branch containing the fault is identified by visual means through observation of a plurality of junctions of lateral branches with the conduit and that branch observed to conduct greater than normal quantities of liquid to the conduit is subjected to treatment by the repair steps defined in said claim.

3. The method defined in claim 1 in which the inflatable means when positioned in the branch between the fault and said point of introduction to the branch is further inflated to completely obstruct passage of liquid through the branch.

4. The method defined in claim 1 in which the restricted portion of the conduit into which grout material is discharged is defined by inflatable means disposed in the conduit in opposite directions respectively from said junction of the branch and tubular grout material conducting means communicate with said restricted portion within one of said inflatable means and with grout material supplying means disposed at the surface upwardly from said conduit adjacent an opening therein.

5. The method defined in claim 1 in which the grout material deposited in the branch between the fault and the conduit is discharged into the conduit by the force of a stream of liquid introduced into the branch at a point remote from the conduit.

6. In combination with an examination and repair unit for a sub-surface conduit adapted to enter the conduit and afford a visual image of the conduit at a remote observation point, means for supplying grouting material to said unit, inflatable means adapted for insertion in a branch of said conduit and for projection to the junction of the branch with the conduit, means connected with said inflatable means for successively inflating and deflating the same and means for retracting said inflatable means from said junction toward the point of its insertion into the branch.

* * * * *